US007334046B1

(12) United States Patent
Betker

(10) Patent No.: US 7,334,046 B1
(45) Date of Patent: Feb. 19, 2008

(54) SYSTEM AND METHOD FOR OPTIMIZING FRAME ROUTING IN A NETWORK

(75) Inventor: Steven Manning Betker, Shoreview, MN (US)

(73) Assignee: QLOGIC, Corporation, Aliso Viejo, CA (US)

(*) Notice: Subject to any disclaimer, the term of this patent is extended or adjusted under 35 U.S.C. 154(b) by 685 days.

(21) Appl. No.: 10/212,425

(22) Filed: Aug. 5, 2002

(51) Int. Cl.
*G06F 13/00* (2006.01)
(52) U.S. Cl. .................................................... 709/241
(58) Field of Classification Search ........ 709/238–239, 709/241; 370/238, 351, 352
See application file for complete search history.

(56) References Cited

U.S. PATENT DOCUMENTS

| 4,162,375 A | 7/1979 | Schilichte ................ 179/15 |
| 4,200,929 A | 4/1980 | Davidjuk et al. |
| 4,382,159 A | 5/1983 | Bowditch |
| 4,425,640 A | 1/1984 | Philip et al. ................ 370/58 |
| 4,546,468 A | 10/1985 | Christmas et al. ........... 370/54 |
| 4,569,043 A | 2/1986 | Simmons et al. ............ 370/63 |
| 4,725,835 A | 2/1988 | Schreiner et al. ...... 340/825.83 |
| 4,821,034 A | 4/1989 | Anderson et al. .......... 340/825 |
| 4,980,857 A | 12/1990 | Walter et al. |
| 5,051,742 A | 9/1991 | Hullett et al. |
| 5,115,430 A | 5/1992 | Hahne et al. |
| 5,144,622 A | 9/1992 | Takiyasu et al. ......... 370/85.13 |
| 5,367,520 A | 11/1994 | Cordell ...................... 370/60 |
| 5,590,125 A | 12/1996 | Acampora et al. |
| 5,598,541 A | 1/1997 | Malladi ..................... 395/286 |
| 5,610,745 A | 3/1997 | Bennett ..................... 359/139 |
| 5,623,492 A | 4/1997 | Teraslinna |
| 5,666,483 A | 9/1997 | McClary |
| 5,687,172 A | 11/1997 | Cloonan et al. ........... 370/395 |
| 5,701,416 A | 12/1997 | Thorson et al. |
| 5,706,279 A | 1/1998 | Teraslinna |

(Continued)

FOREIGN PATENT DOCUMENTS

EP 0649098 9/1994

(Continued)

OTHER PUBLICATIONS

Melhem Rami et al. "Minimizing Wave Length Conversions in WDM Path Establishment", p. 197-211, 2001.*

(Continued)

*Primary Examiner*—Robert B. Harrell
(74) *Attorney, Agent, or Firm*—Klein, O'Neill & Singh, LLP; T J Singh

(57) ABSTRACT

A method for routing Fibre Channel frames in a Fibre Channel system is provided. The method compares a cost associated with a pre-programmed preferred route when the pre-programmed preferred route has been pre-programmed to route Fibre Channel frames between a source Fibre Channel port and a destination Fibre Channel port; with a cost of at least one route for routing Fibre channel frames between the source Fibre Channel port and the destination port determined by using a standard Fibre Channel Fabric Shortest Path First (FSPF) protocol, and using the pre-programmed-preferred route to route Fibre Channel frames if the cost associated with the pre-programmed preferred route is lower than the cost associated with the at least one route determined by the standard Fibre Channel FSPF protocol.

14 Claims, 4 Drawing Sheets

U.S. PATENT DOCUMENTS

| | | |
|---|---|---|
| 5,748,612 A | 5/1998 | Stoevhase et al. .......... 370/230 |
| 5,812,525 A | 9/1998 | Teraslinna |
| 5,818,842 A | 10/1998 | Burwell et al. ............. 370/397 |
| 5,821,875 A | 10/1998 | Lee et al. |
| 5,828,475 A | 10/1998 | Bennett et al. |
| 5,835,752 A | 11/1998 | Chiang et al. |
| 5,954,796 A | 9/1999 | McCarty et al. |
| 5,978,359 A | 11/1999 | Caldara et al. |
| 5,987,028 A | 11/1999 | Yang et al. ................. 370/380 |
| 5,999,528 A | 12/1999 | Chow et al. ................ 370/365 |
| 6,014,383 A | 1/2000 | McCarty ..................... 370/453 |
| 6,021,128 A | 2/2000 | Hosoya et al. .............. 370/380 |
| 6,026,092 A | 2/2000 | Abu-Amara et al. |
| 6,031,842 A | 2/2000 | Trevitt et al. |
| 6,047,323 A | 4/2000 | Krause ....................... 709/227 |
| 6,055,618 A | 4/2000 | Thorson |
| 6,061,360 A | 5/2000 | Miller et al. |
| 6,081,512 A | 6/2000 | Muller et al. ............... 370/256 |
| 6,108,738 A | 8/2000 | Chambers et al. |
| 6,108,778 A | 8/2000 | LaBerge |
| 6,118,776 A | 9/2000 | Berman |
| 6,128,292 A | 10/2000 | Kim et al. ................... 370/356 |
| 6,144,668 A | 11/2000 | Bass et al. |
| 6,160,813 A | 12/2000 | Banks et al. ................ 370/422 |
| 6,201,787 B1 | 3/2001 | Baldwin et al. |
| 6,229,822 B1 | 5/2001 | Chow et al. |
| 6,240,096 B1 | 5/2001 | Book |
| 6,253,267 B1 | 6/2001 | Kim et al. |
| 6,289,002 B1 | 9/2001 | Henson et al. |
| 6,308,220 B1 | 10/2001 | Mathur ....................... 709/238 |
| 6,324,181 B1 | 11/2001 | Wong et al. ................. 370/403 |
| 6,330,236 B1 | 12/2001 | Ofek et al. .................. 370/369 |
| 6,353,612 B1 | 3/2002 | Zhu et al. |
| 6,401,128 B1 | 6/2002 | Stai et al. |
| 6,411,599 B1 | 6/2002 | Blanc et al. ................. 370/219 |
| 6,411,627 B1 | 6/2002 | Hullett et al. |
| 6,418,477 B1 | 7/2002 | Verma |
| 6,421,711 B1 | 7/2002 | Blumenau et al. |
| 6,424,658 B1 | 7/2002 | Mathur ....................... 370/429 |
| 6,449,274 B1 | 9/2002 | Holden et al. .............. 370/392 |
| 6,452,915 B1 | 9/2002 | Jorgensen |
| 6,467,008 B1 | 10/2002 | Gentry et al. |
| 6,470,026 B1 | 10/2002 | Pearson et al. |
| 6,532,212 B1* | 3/2003 | Soloway et al. ............ 370/230 |
| 6,570,850 B1 | 5/2003 | Gutierrez et al. |
| 6,594,231 B1 | 7/2003 | Byham et al. |
| 6,597,691 B1 | 7/2003 | Anderson et al. ........... 370/360 |
| 6,597,777 B1 | 7/2003 | Ho |
| 6,614,796 B1 | 9/2003 | Black et al. |
| 6,697,359 B1 | 2/2004 | George ....................... 370/357 |
| 6,697,368 B2 | 2/2004 | Chang et al. |
| 6,718,497 B1 | 4/2004 | Whitby-Strevens |
| 6,744,772 B1 | 6/2004 | Eneboe et al. |
| 6,760,302 B1 | 7/2004 | Ellinas et al. |
| 6,785,241 B1 | 8/2004 | Lu et al. |
| 6,807,181 B1 | 10/2004 | Weschler |
| 6,816,750 B1 | 11/2004 | Klaas |
| 6,859,435 B1 | 2/2005 | Lee et al. |
| 6,865,157 B1 | 3/2005 | Scott et al. |
| 6,886,141 B1 | 4/2005 | Kunz et al. |
| 6,941,357 B2 | 9/2005 | Nguyen et al. |
| 6,941,482 B2 | 9/2005 | Strong |
| 6,952,659 B2 | 10/2005 | King et al. |
| 6,968,463 B2 | 11/2005 | Pherson et al. |
| 7,000,025 B1 | 2/2006 | Wilson |
| 7,002,926 B1 | 2/2006 | Eneboe et al. |
| 7,010,607 B1 | 3/2006 | Bunton |
| 7,039,070 B2 | 5/2006 | Kawakatsu |
| 7,039,870 B2 | 5/2006 | Takaoka et al. |
| 7,047,326 B1 | 5/2006 | Crosbie et al. |
| 7,050,392 B2* | 5/2006 | Valdevit ..................... 370/228 |
| 7,055,068 B2 | 5/2006 | Riedl |
| 7,061,871 B2 | 6/2006 | Sheldon et al. |
| 7,092,374 B1 | 8/2006 | Gubbi |
| 7,110,394 B1 | 9/2006 | Chamdani et al. |
| 7,124,169 B2 | 10/2006 | Shimozono et al. |
| 7,151,778 B2 | 12/2006 | Zhu et al. |
| 7,171,050 B2 | 1/2007 | Kim |
| 7,185,062 B2 | 2/2007 | Lolayekar et al. |
| 7,194,538 B1 | 3/2007 | Rabe et al. |
| 7,200,108 B2 | 4/2007 | Beer et al. |
| 7,215,680 B2 | 5/2007 | Mullendore et al. |
| 7,221,650 B1 | 5/2007 | Cooper et al. |
| 7,248,580 B2 | 7/2007 | George et al. |
| 7,269,131 B2 | 9/2007 | Cashman et al. |
| 2001/0011357 A1 | 8/2001 | Mori |
| 2001/0038628 A1 | 11/2001 | Ofek et al. ................. 370/392 |
| 2002/0034178 A1 | 3/2002 | Schmidt et al. |
| 2002/0103913 A1 | 8/2002 | Tawil et al. |
| 2002/0104039 A1 | 8/2002 | DeRolf et al. |
| 2002/0124124 A1 | 9/2002 | Matsumoto et al. |
| 2002/0147560 A1 | 10/2002 | Devins et al. |
| 2002/0147843 A1 | 10/2002 | Rao |
| 2002/0156918 A1* | 10/2002 | Valdevit et al. ............. 709/238 |
| 2002/0172195 A1 | 11/2002 | Pekkala et al. |
| 2002/0191602 A1 | 12/2002 | Woodring et al. |
| 2002/0196773 A1 | 12/2002 | Berman |
| 2003/0016683 A1 | 1/2003 | George et al. |
| 2003/0021239 A1 | 1/2003 | Mullendore et al. |
| 2003/0026267 A1 | 2/2003 | Oberman et al. |
| 2003/0026287 A1 | 2/2003 | Mullendore et al. |
| 2003/0035433 A1 | 2/2003 | Craddock et al. |
| 2003/0046396 A1 | 3/2003 | Richter et al. |
| 2003/0072316 A1 | 4/2003 | Niu et al. |
| 2003/0079019 A1 | 4/2003 | Lolayekar et al. |
| 2003/0084219 A1 | 5/2003 | Yao et al. |
| 2003/0086377 A1 | 5/2003 | Berman |
| 2003/0091062 A1 | 5/2003 | Lay et al. |
| 2003/0103451 A1 | 6/2003 | Lutgen et al. |
| 2003/0117961 A1 | 6/2003 | Chuah et al. |
| 2003/0120983 A1 | 6/2003 | Vieregge et al. |
| 2003/0137941 A1 | 7/2003 | Kaushik et al. |
| 2003/0174789 A1 | 9/2003 | Waschura et al. |
| 2003/0179709 A1 | 9/2003 | Huff |
| 2003/0179748 A1 | 9/2003 | George et al. .............. 370/389 |
| 2003/0189930 A1 | 10/2003 | Terrell et al. |
| 2003/0189935 A1* | 10/2003 | Warden et al. ......... 370/395.21 |
| 2003/0195983 A1 | 10/2003 | Krause |
| 2003/0229808 A1 | 12/2003 | Heintz et al. |
| 2004/0013092 A1 | 1/2004 | Betker et al. |
| 2004/0013125 A1 | 1/2004 | Betker et al. |
| 2004/0015638 A1 | 1/2004 | Bryn |
| 2004/0024831 A1 | 2/2004 | Yang et al. |
| 2004/0028038 A1 | 2/2004 | Anderson et al. |
| 2004/0057389 A1 | 3/2004 | Klotz et al. |
| 2004/0081186 A1 | 4/2004 | Warren et al. |
| 2004/0081394 A1 | 4/2004 | Biren et al. |
| 2004/0085955 A1 | 5/2004 | Walter et al. |
| 2004/0100944 A1 | 5/2004 | Richmond et al. |
| 2004/0109418 A1 | 6/2004 | Fedorkow et al. |
| 2004/0123181 A1 | 6/2004 | Moon et al. |
| 2004/0141521 A1 | 7/2004 | George ....................... 370/463 |
| 2004/0153914 A1 | 8/2004 | El-Batal |
| 2004/0174813 A1 | 9/2004 | Kasper et al. |
| 2004/0208201 A1 | 10/2004 | Otake |
| 2004/0267982 A1 | 12/2004 | Jackson et al. |
| 2005/0023656 A1 | 2/2005 | Leedy |
| 2005/0036499 A1 | 2/2005 | Dutt et al. |
| 2005/0117522 A1 | 6/2005 | Basavaiah et al. |
| 2005/0177641 A1 | 8/2005 | Yamagami |
| 2006/0047852 A1 | 3/2006 | Shah et al. |
| 2006/0074927 A1 | 4/2006 | Sullivan et al. |

2006/0184711 A1    8/2006 Pettey

FOREIGN PATENT DOCUMENTS

| EP | 0856969      | 1/1998  |
|----|--------------|---------|
| WO | WO-98/36537  | 8/1998  |
| WO | WO03/088050  | 10/2003 |

OTHER PUBLICATIONS

U.S. Appl. No. 60/286,046 (Valdevit et al.) pp. 1-40, Abstract, Claims, and Drawings.*

Clark, Tom, "Zoning for Fibre Channel Fabrics", Vixel Corporation Paper—XP002185194., (Aug. 1999), pp. 1-6.

Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.

Martin, Charles R., "Fabric Interconnection of fibre channel standard nodes", Proceedings of the SPIE, (Sep. 8, 1992), pp. 65-71.

Yoshida, Hu, "LUN Security Considerations for Storage Area Networks," Hitachi Data Systems Paper—XP 002185193 (1999), pp. 1-7.

Claudio DeSanti, "Virtual Fabrics Switch Support"; VF Switch Support, T11/04-395v2. Sep. 2004, pp. 1-15.

Pelissier et al, "Inter-Fabric Routing", dated Jul. 30, 2004, Inter Fabric Routing (04-520v0); pp. 1-31.

DeSanti et al, "Virtual Fabrics"; Virtual Fabrics, T11/03-352v0, May 2003; pp. 1-4.

Martin et al , "Virtual Channel Architecture", Presentation by Brocade to T11/03-369V0 dated Jun. 2, 2003.

Fibre Channel Switch Fabric—2 (FC-SW-2) Rev 5.4, NCITS working draft proposed American National Standard for Information Technology, Jun. 26, 2001., T11/Project 1305—D/Rev 5.4.

Fibre Channel Generic Services—3 (FC-GS-3) Rev 7.01, NCITS working draft proposed American National Standard for Information Technology, Nov. 28, 2000., T11/Project 1356 D/Rev 7.01.

Brown, Douglas W., "A State-Machine Synthesizer", *18th Design Automation Conference*, (1981),301-305.

"Examination Report from the European Patent Office dated Oct. 12, 2007 for European Application No. 05 805 632.6".

Curtis, A. R., "Design Considerations for 10-Gbit Fibre Channel", Curtis A. Ridgeway, *Distinguished I/O Architect, Storage and Computing ASIC's Division, LSI Logic Corp.*, no date.

Malavalli, Kumar, "High Speed Fibre Channel Switching Fabric Devices", *Proceedings of the SPIE, SPIE*, Bellingham, VA, USA vol. 1577., XP000562869, ISSN: 0277-786X, (Sep. 4, 1991),216-226.

Ridgeway, Curt , "0GFC-40GFC using 4-lane XAUI's", *LSI Logic Presentation*—T11/03-069vo, no date.

* cited by examiner

200
MULTI
MODULE
SWITCH

SYSTEM AND METHOD FOR OPTIMIZING FRAME ROUTING IN A NETWORK

BACKGROUND

1. Field of the Invention

The present invention relates to networking systems, and more particularly to systems using fibre channel fabrics for interconnecting fibre channel devices.

2. Background of the Invention

Fibre channel is a set of American National Standard Institute (ANSI) standards, which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel, a path is established between two nodes where the path's primary task is to transport data from one point to another at high speed with low latency, performing only simple error detection in hardware. The fibre channel switch provides circuit/packet switched topology by establishing multiple simultaneous point-to-point connections.

Fibre channel fabric devices include a node port or "N_Port" that manages fabric connections. The N_port establishes a connection to a fabric element (e.g., a switch) having a fabric port or F_port. Fabric elements include the intelligence to handle routing, error detection, recovery, and similar management functions.

A fibre channel switch is a multi-port device where each port manages a simple point-to-point connection between itself and its attached system. Each port can be attached to a server, peripheral, I/O subsystem, bridge, hub, router, or even another switch. A switch receives a message from one port and automatically routes it to another port. Multiple calls or data transfers happen concurrently through the multi-port fibre channel switch.

Fibre channel switches may use multiple modules (also referred to as "blades") connected by fibre channel ports. Conventionally, a multi-module switch is integrated as a single switch and appears to other devices in the fibre channel fabric as a single switch.

Fibre channel standard FC-SW-2, Revision 5.4, incorporated herein in its entirety, provides a Fabric Shortest Path First ("FSPF") protocol (Section 8 of FC-SW-2). FSPF is a link state path selection protocol that uses a path computation algorithm for selecting a path from a source to a destination port based on the cost of the path and forwarding frames to a specific destination.

In Fibre Channel, the most commonly used application is SCSI. SCSI over Fibre Channel (usually referred to as SCSI-FCP) requires in-order delivery of frames. This means that Fibre Channel switches must select a fixed path from a source port to a destination port, even if multiple paths are available.

Fabrics may have multiple routes to the same destination with equal cost within the FSPF protocol. A switch may choose any of these equivalent paths for routing frames. Some switches or Fabrics may want to choose specific routes for reasons not specified in the Fibre Channel standards. For example, a user may wish to balance the load between several paths for the traffic pattern seen on that Fabric. A multi-module Fibre Channel switch may want to have the same routing pattern between modules for predictability and to avoid bottlenecks. This results in preferred routing for the switch.

However, preferred routing has drawbacks. The predetermined preferred routing assumes that all connections are working and it fails if some connections are not working. In addition, preferred routing set up by a user may have errors that can cause a Fabric to malfunction. If a preferred route is not one of the FSPF lowest cost routes, other switches may choose routes that are not consistent.

Therefore, what is required is a process and system that provides a flexible, self-correcting routing technique so that a preferred route is used if viable, and if not, an alternate route can be used.

SUMMARY OF THE INVENTION

In one aspect of the present invention, a method for selecting a routing path in a fibre channel system is provided. The process determines if a preferred route is available for a source and destination port, compares the preferred route with a standard calculated Fabric Shortest Path First (FSPF) routes, and uses the preferred route if its cost is similar to one of the lowest cost FSPF routes. The process uses one of the FSPF routes if it is lower cost than the preferred route or if a preferred route is not available.

In one aspect of the present invention, using preferred routes does not risk Fabric malfunction if failures or user error occurs, and hence provides flexibility in frame routing.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions:

The following definitions are provided as they are typically (but not exclusively) used in the fibre channel environment, implementing the various adaptive aspects of the present invention.

"Fibre Channel ANSI Standard": The standard describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"Fabric": A system which interconnects various ports attached to it and is capable of routing fibre channel frames by using destination identifiers provided in FC-2 frame headers.

"Fabric Topology": This is a topology where a device is directly attached to a fibre channel fabric that uses destination identifiers embedded in frame headers to route frames through a fibre channel fabric to a desired destination.

Port: A general reference to N. Sub.--Port or F.Sub.--Port.

The Fibre Channel Specification used to build one embodiment of the present invention includes:

FC-SW-2 standard as published by the American National Standard Institute.

To facilitate an understanding of the preferred embodiment, the general architecture and operation of a fibre channel system will be described. The specific architecture and operation of the preferred embodiment will then be described with reference to the general architecture of the fibre channel system.

Figure 1:
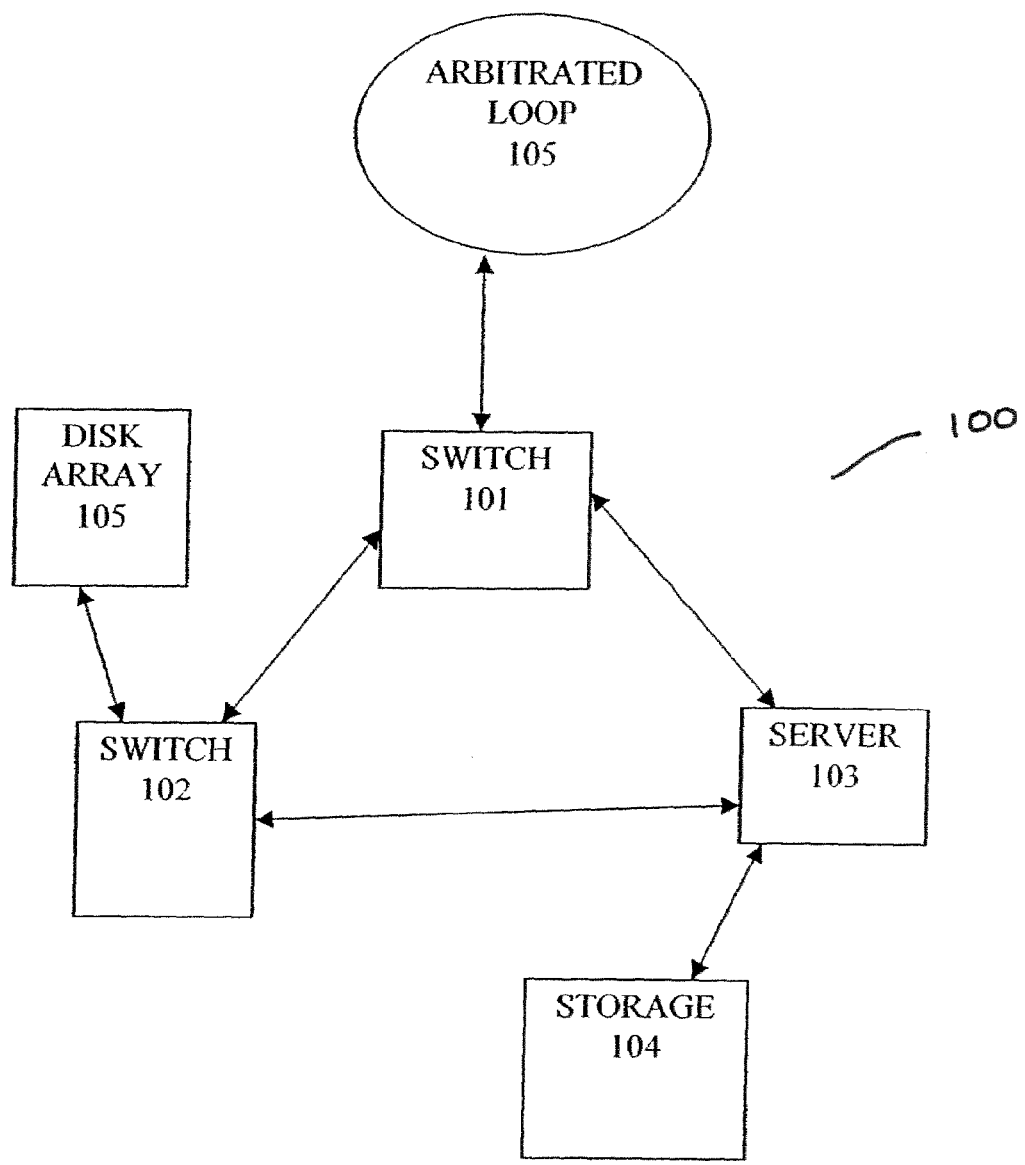
FIG. 1, as described above, shows a block diagram of a fibre channel system using a fibre channel fabric.

FIG. 1 is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 105 may be operationally coupled to switch 101 using arbitrated loop ports (FL_Ports).

The devices of FIG. 1 are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Switch 101 includes an E_Port that enables a path to another switch 102. An inter-switch link ("ISL") enables N_Ports to operationally couple to other N-Ports in a fabric.

Figure 2:
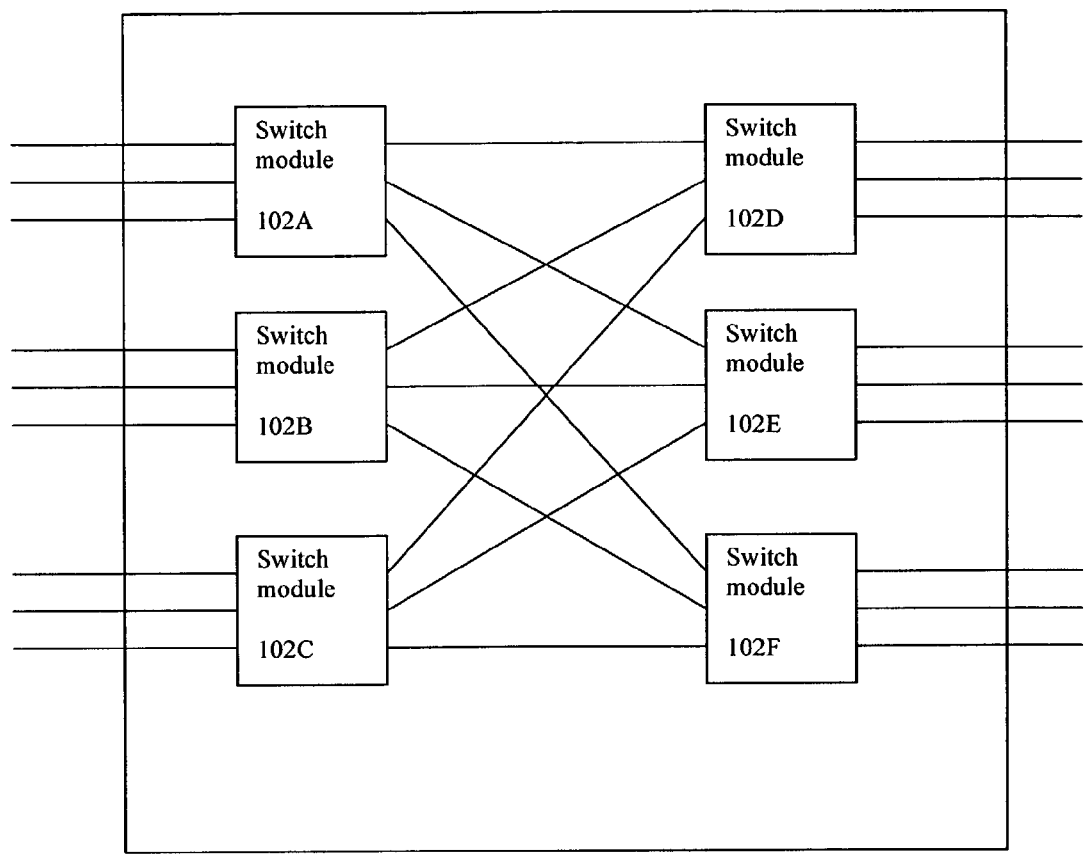
FIG. 2 is a block diagram showing multi-module switch.

FIG. 2 is a block diagram that shows plural switch modules (or blades) 102A-102F (or 103) integrated into a single multi-module switch 200. Internal ports between the switch modules operate on a multi-blade protocol, while external ports operate under FC-SW-2 protocol.

Figure 3:
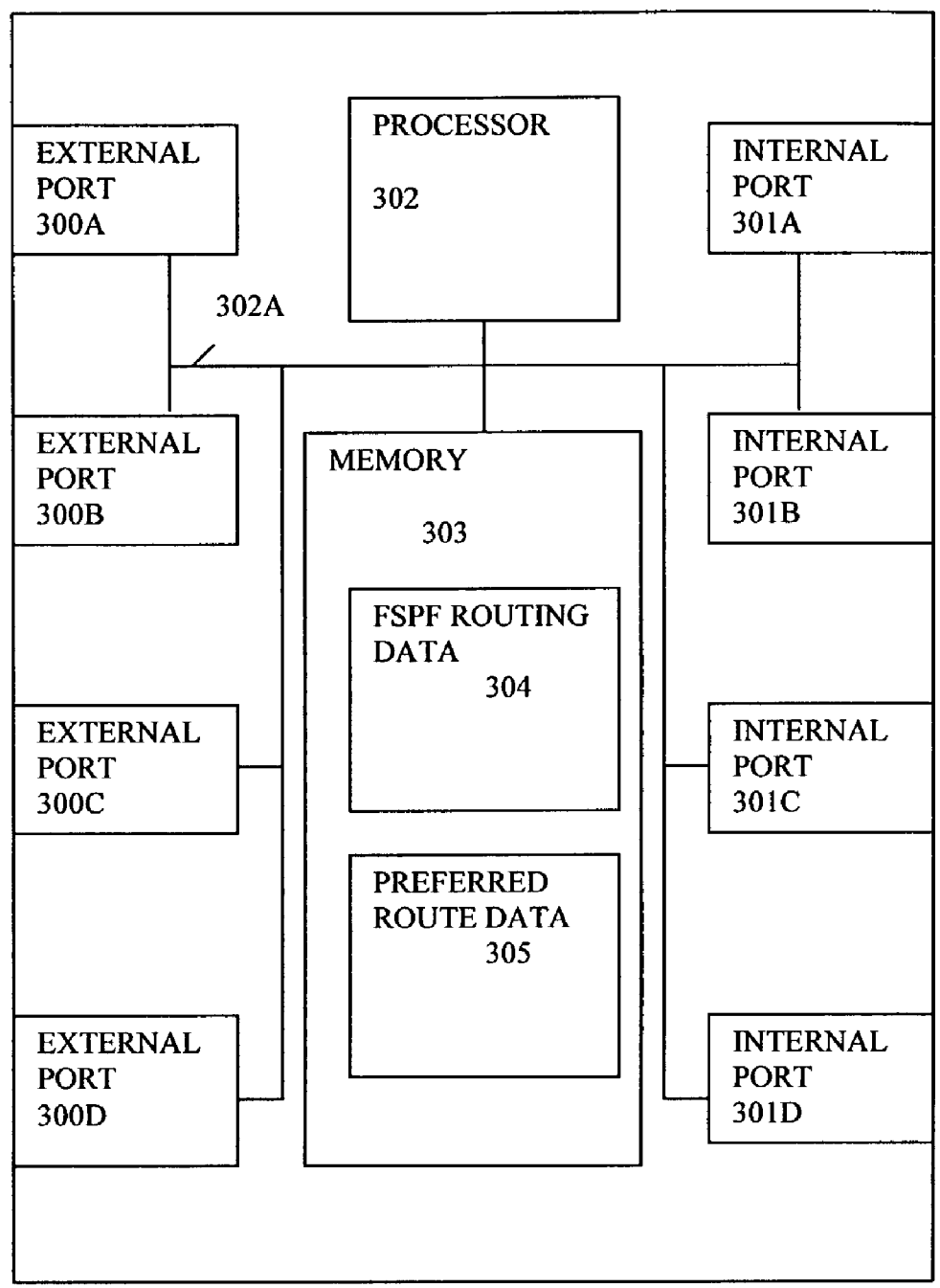
FIG. 3 is block diagram of a switch module in a multi-module switch environment, according to one aspect of the present invention.

FIG. 3 is a block diagram of a blade in a multi-module switch, e.g. blade 102A, that implements the adaptive aspects of the present invention. Switch module 102A includes plural external ports (F_Ports operationally coupled to other devices, e.g. server 103; or E_Ports coupled to other switch modules) 300A through 300D; and internal ports 301A-301D that operate under the multi-blade protocol.

Switch 102A also includes a processor 302 (Intel i960 processor, Pentium Class™ or any other microprocessor may be used) coupled to a bus 302A. Processor 302 executes the process steps, described below by loading the steps from memory 303. Memory 303 includes preferred route data 305 and FSPF route data 304.

Figure 4:
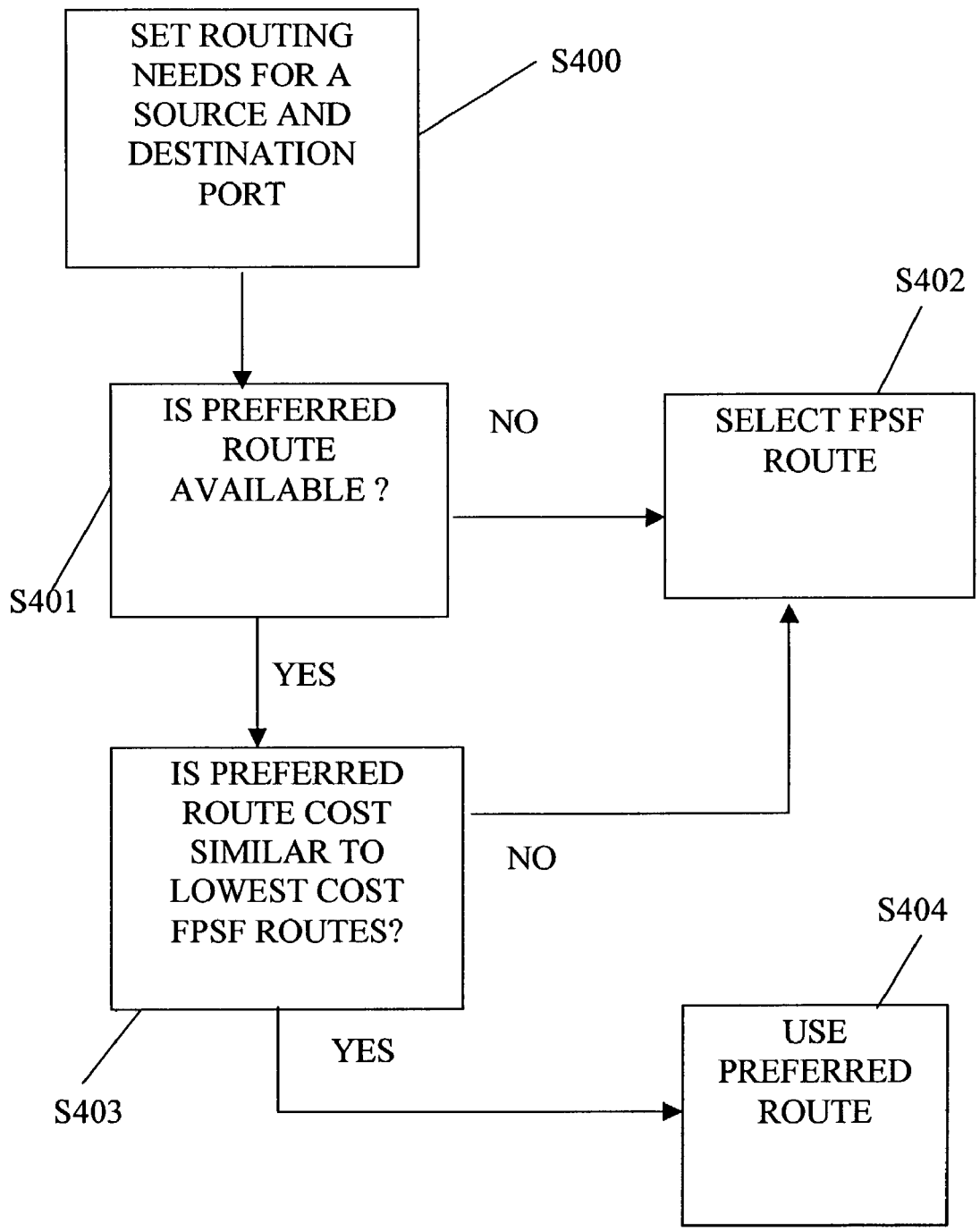
FIG. 4 is a flow diagram of executable process steps for selecting a routing path for fibre channel frames.

FIG. 4 is a flow diagram of executable process steps for routing packets in a fibre channel switch environment. The process allows for choosing the most efficient and optimum path for routing frame packets.

Turning in detail to FIG. 4, in step S400, a fibre channel switch sets routing needs for a source and destination port and then determines the route to use for a specified source port and destination switch.

In step S401, the process determines if a preferred route is available for the source and/or destination port(s). A preferred route may be pre-programmed for a specific port in a table or may be input by a switch management module (not shown), or calculated by processor 302. The preferred routes may be stored as a table in memory 303 for a particular switch product, calculated for a particular switch product, or created by a switch management module.

If a preferred route is not available, in step S402, the process uses any one of the lowest cost routes determined by the FSPF protocol, as defined by FC-SW-2.

If a preferred route is available, then in step S403, the process compares the cost of the preferred route with the FSPF routes. If the preferred route cost is similar to one of the lowest cost FSPF route(s), then the process uses the preferred route in step S404.

If the FSPF route is lower cost, then the process moves to step S402, where the FSPF routing is used.

Typically, firmware used by processor 302 firmware implements the foregoing routing steps. However, dedicated hardware may use the foregoing process steps to efficiently execute the foregoing process steps.

It is noteworthy that the foregoing process steps may be used for routing frames between internal modules of a multi-module switch or for routing frames between external ports. The adaptive aspects of the foregoing invention are not limited to multi-module or non-multi-module switches.

In one aspect of the present invention, the process allows the switch to try to use preferred routes but prevents problems if the fixed routes are not viable because of failures or errors, and hence provides flexibility in frame routing.

Although the present invention has been described with reference to specific embodiments, these embodiments are illustrative only and not limiting. Many other applications and embodiments of the present invention will be apparent in light of this disclosure and the following claims.

What is claimed is:

1. A method for routing Fibre Channel frames in a Fibre Channel system, comprising:

storing a pre-programmed preferred route in a memory accessible to a processor of a Fibre Channel switch element to route Fibre Channel frames from a source Fibre Channel port to a destination Fibre Channel port;

comparing a cost associated with the pre-programmed preferred route; with a cost associated with a lowest cost route that is determined by using a standard Fibre Channel Fabric Shortest Path First (FSPF) protocol;

using the pre-programmed-preferred route to route the Fibre Channel frames if the cost associated with the pre-programmed preferred route is equal to or lower than the cost associated with the lowest cost route determined by the standard Fibre Channel FSPF protocol; and using a route determined by the standard Fibre Channel FSPF protocol if a preferred route has not been pre-programmed.

2. The method of claim 1, wherein the pre-programmed preferred route is specified to route frames between external Fibre Channel switch element ports.

3. The method of claim 1, wherein the pre-programmed preferred route is specified to route frames between internal modules of a multi-module Fibre Channel switch.

4. The method of claim 1, wherein the pre-programmed preferred route is pre-programmed by using a switch management module.

5. A Fibre Channel switch element, comprising:

a processor executing firmware code for comparing a cost associated with a pre-programmed preferred route stored in a memory that is accessible to the processor, with a cost associated with a lowest cost route determined by using a standard Fibre Channel Fabric Shortest Path First (FSPF) protocol, wherein the pre-programmed preferred route is pre-programmed to route frames between a source Fibre Channel port and a destination Fibre Channel port and the pre-programmed preferred route is used if the cost associated with the pre-programmed preferred route is equal to or lower than the cost associated with the lowest cost route determined by the standard Fibre Channel FSPF protocol.

6. The switch element of claim 5, wherein the pre-programmed preferred route is specified to route frames between external Fibre Channel switch element ports.

7. The switch element of claim 5, wherein the lowest cost route determined by using the standard Fibre Channel FSPF protocol is used to route Fibre Channel frames if the pre-programmed preferred route has not been pre-programmed in the memory.

8. The switch element of claim 5, wherein the pre-programmed preferred route is specified to route frames between internal modules of a multi-module Fibre Channel switch.

9. The switch element of claim 5, wherein the pre-programmed preferred route is pre-programmed by using a switch management module.

10. A Fibre Channel network, comprising:

a Fibre Channel switch element with a processor executing firmware code for comparing a cost associated with a pre-programmed preferred route stored in a memory accessible by the processor with a cost associated with a lowest cost route determined by using a standard Fibre Channel Fabric Shortest Path First (FSPF) protocol, wherein the pre-programmed preferred route is pre-programmed to route frames between a source Fibre Channel port and a destination Fibre Channel port; and the pre-programmed preferred route is used if the cost associated with the pre-programmed preferred route is equal to or lower than the cost associated with the lowest cost route determined by the standard Fibre Channel FSPF protocol.

11. The switch element of claim 10, wherein the pre-programmed preferred route is specified to route frames between external Fibre Channel switch element ports.

12. The switch element of claim 10, wherein the lowest cost route determined by the standard Fibre Channel FSPF protocol is used to route frames if a preferred route has not been pre-programmed.

13. The switch element of claim 10, wherein the pre-programmed preferred route is specified for a particular switch.

14. The switch element of claim 10, wherein the preferred route is stored as a table in the memory accessible to the processor.

* * * * *

UNITED STATES PATENT AND TRADEMARK OFFICE
CERTIFICATE OF CORRECTION

| | |
|---|---|
| PATENT NO. | : 7,334,046 B1 |
| APPLICATION NO. | : 10/212425 |
| DATED | : February 19, 2008 |
| INVENTOR(S) | : Steven Manning Betker |

It is certified that error appears in the above-identified patent and that said Letters Patent is hereby corrected as shown below:

In column 4, line 9, delete "Class™" and insert -- class™ --, therefor.

Signed and Sealed this

Twenty-seventh Day of April, 2010

David J. Kappos
*Director of the United States Patent and Trademark Office*